(12) United States Patent
Holmes

(10) Patent No.: US 12,703,469 B1
(45) Date of Patent: Aug. 11, 2026

(54) SYSTEM AND METHOD FOR A HINGED FLANGE WITH QUICK CONNECT ADAPTER FOR A JET BOAT

(71) Applicant: Donald Holmes, Scottsdale, AZ (US)

(72) Inventor: Donald Holmes, Scottsdale, AZ (US)

( * ) Notice: Subject to any disclaimer, the term of this patent is extended or adjusted under 35 U.S.C. 154(b) by 643 days.

(21) Appl. No.: 18/098,655

(22) Filed: Jan. 18, 2023

Related U.S. Application Data

(60) Provisional application No. 63/301,048, filed on Jan. 19, 2022.

(51) Int. Cl.
*B63H 11/113* (2006.01)
*F16B 7/02* (2006.01)

(52) U.S. Cl.
CPC .............. *B63H 11/113* (2013.01); *F16B 7/02* (2013.01); *F16B 2200/503* (2018.08); *F16B 2200/506* (2018.08)

(58) Field of Classification Search
CPC ..... B63H 11/113; B63H 11/10; B63H 11/101; B63H 11/102; B63H 11/103; B63H 11/11; F16B 7/02; F16B 2200/503; F16B 2200/506; F16L 23/02; F16L 23/024; F16L 23/026; F16L 23/028; F16L 23/0283; F16L 23/0286; F16L 23/032; F16L 23/0036
See application file for complete search history.

(56) References Cited

U.S. PATENT DOCUMENTS 6,305,995 B1 10/2001 Stauning
6,514,107 B1 2/2003 Sparrow
9,387,914 B2 7/2016 Hubbard
10,618,619 B2 4/2020 Basten
2015/0233508 A1 8/2015 Sceviour
2017/0050730 A1 2/2017 Robinson
2020/0239117 A1* 7/2020 Broinowski .......... F01N 3/0205

FOREIGN PATENT DOCUMENTS

JP 2001124267 A * 5/2001 .............. F16L 23/02
WO WO2001010710 2/2001

* cited by examiner

*Primary Examiner* — Andrew Polay
(74) *Attorney, Agent, or Firm* — Michelle L. Gross, P.C.

(57) ABSTRACT

A system and method are disclosed for allowing a user to quickly and with minimal tools repurpose the outflow of a jet boat for alternative purposes such as a jet-powered water board. This is accomplished via a hinged flange inserted between the bowl of a jet boat and the snoot. When a user wishes to repurpose the jet boat outflow, they can simply remove the fasteners holding the rotating flange to the mounted flange and move the rotating flange to the open position. The mounted flange is configured with additional fastener slots to then allow a different nozzle type to be affixed to the mounted flange while the outflow assembly remains mostly assembled. This allows the outflow assembly to be quickly put back in place when the user is done with other water recreation activities and wishes to once again use the jet boat as a watercraft.

16 Claims, 4 Drawing Sheets

SYSTEM AND METHOD FOR A HINGED FLANGE WITH QUICK CONNECT ADAPTER FOR A JET BOAT

CROSS REFERENCE TO RELATED APPLICATIONS

This application claims priority to U.S. Application No. 63/301,048 entitled "System and Method for a Hinged Flange With Quick Connect Adapter for a Jet Boat," filed on Jan. 19, 2022.

BACKGROUND

1. Field of the Invention

The present invention relates generally a device for and method of attaching a quick connect adapter to a jet boat. More particularly, it relates to a hinged flange allowing for quickly removing a droop snoot and adjustable nozzle orifice and attachment of a quick connect adapter.

2. Description of Related Art

Many jet boats require multiple attachments such as a droop snoot and adjustable nozzle in order to direct a jet of water in ways that are useful for piloting and controlling the jet boat. However, the flow of water from a jet boat outflow port may be useful in other applications or when used with different nozzle assemblies, so nozzles may need to be changed if a user intends to take advantage of these other applications. This requires the disassembly of almost all of the jet outflow assembly in the rear of the jet boat, often with several tools required for different fasteners used with each nozzle layer. Then the user needs to install the nozzle assembly they intend to use for the other application, and then uninstall this new nozzle and reinstall the original nozzle assembly before using the jet boat as a jet boat again. This process can be extremely time consuming, even for users experienced in assembling and disassembling parts of their jet boat.

So as to reduce the complexity and length of the Detailed Specification, and to fully establish the state of the art in certain areas of technology, Applicant(s) herein expressly incorporate(s) by reference all of the following materials identified in each numbered paragraph below.

Basten, M., U.S. Pat. No. 10,618,619 filed 2016, Closed tunnel system and directional device for outboard jet motors. Basten discloses among other things, an outboard jet motor and an attachment with an adapter which fits over the nozzle of the outboard jet motor to allow the attachment of a steering nozzle. The nozzle is configured with a bucket allowing the jet motor a greater degree of control and the ability to reverse.

Sparrow, G. E., U.S. Pat. No. 6,514,107 filed 2001, Universal valve, hose and nozzle assembly for use with a personal watercraft. Sparrow discloses among other things, a valve hose and nozzle assembly with an adapter for attaching to the output of a personal watercraft. The adapter comprising a pliant, internally hollowed and rubberized material which fits over the tail pipe of the watercraft and extends from a flow diversion member which is partially inserted into the tail pipe.

Stauning et al., U.S. Pat. No. 6,305,995 filed 2000, Detachable firefighting attachment for a personal watercraft. Stauning et al. discloses among other things, a fire fighting attachment which couples with the discharge nozzle of a personal watercraft via truncated conical fitting which inserts within the discharge nozzle and is secured by a pair of pins on either side of the discharge nozzle. The discharge nozzle described here is conical with the tapering end of the cone directed inwardly toward the boat. The attachment includes a steering nozzle below the level of the discharge nozzle, and the firefighting nozzle above the level of the discharge nozzle, with a flap valve allowing water to be diverted to either the firefighting or steering nozzle.

Laakso, K., WO 2001/010710 filed 1999, System and apparatus for using a water jet engine as a water pump and a steering nozzle for a water jet engine. Laakso discloses among other things, a steering nozzle configured to pair with a first end of a pump adapter held in a fixed structure attached to the steering nozzle.

Sceviour, N., US 2015/0,233,508 filed 2014, Method and system for delivering water using a water-jet propelled watercraft. Sceviour discloses among other things, a hose nozzle configured to couple to a water jet outlet to convert a water jet used for propulsion into a water pump for the hose.

Robinson, B., US 2017/0,050,730 filed 2012, Hover board with quick disconnect hose. Robinson discloses among other things, a male end quick connect which couples a fire hose with a hover board, the fire hose powered by a jet ski or other pump.

Hubbard et al., U.S. Pat. No. 9,387,914 filed 2014, Control systems for personal propulsion devices. Hubbard et al. discloses among other things, a male end quick connect on a water jet pack, which connects to a pressurized water hose which receives pressure from a pressurized fluid source. The pressurized fluid source is depicted in FIG. 1 as a personal water craft.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

Implementations of the present invention include a hinged flange comprising a mounted flange arranged and configured to couple with a bowl of a jet boat, and the mounted flange further arranged and configured to couple with a nozzle. The hinged flange further comprises a rotating flange coupled to the mounted flange via a hinge configured to allow the rotating flange to rotate between a closed position in which the rotating flange is substantially flush with the mounted flange and an open position in which the rotating flange is not substantially flush with the mounted flange. The rotating flange is further arranged and configured to couple to the mounted flange when in the closed position via one or more fasteners. The rotating flange is also configured to couple with a snoot of a jet boat.

Particular aspects of the hinged flange may include that the nozzle may comprise a quick-connect nozzle, the bowl may be a split bowl or a double drilled bowl. In other implementations the mounted flange is configured to couple with the bowl of the jet boat via a plurality of fastener slots. The hinged flange may also include a gasket coupled to the mounted flange. The snoot may be either a straight snoot or a droop snoot, and in either case may be configured to couple with a flow diverter.

In another implementation, a hinged with snoot and flow diverter assembly may comprise a hinged flange with a mounted flange, the mounted flange having a first one or more hinge knuckles along at least one edge of the mounted flange and a first plurality of fastener slots. The hinged flange also has a rotating flange having a second one or more hinge knuckles along at least one edge of the rotating flange and a second plurality of fastener slots. Further, the rotating flange may be coupled to the mounted flange via at least one pin configured to pass through the first one or more hinge knuckles of the mounted flange and the second one or more hinge knuckles of the rotating flange. In such implementations the rotating flange is coupled to the mounted flange such that at least one of the second plurality of fastener slots is substantially aligned with at least one of the first plurality of fastener slots when the rotating flange is substantially flush with the mounted flange. This implementation also includes a snoot and flow diverter assembly coupled to the rotating flange via a fastener passed through at least one of the second plurality of fastener slots, the snoot and flow diverter assembly comprising a snoot and a flow diverter.

Particular aspects of this hinged flange with snoot and flow diverter assembly may include implementations where the hinged flange further comprises at least one hinge connector, the hinge connector comprising two or more slots configured to accommodate the pin. Further, the snoot may comprise at least one of a straight snoot and a droop snoot. Further, the flow diverter may comprise a rudder or a place diverter. In some implementations the hinged flange further comprises a gasket coupled to the mounted flange. In others the mounted flange is coupled to a bowl of a jet boat via one or more fasteners inserted through the first plurality of fastener slots.

Implementing the invention may proceed by removing one or more fasteners from a hinged flange, rotating the rotating flange away from the mounted flange, and affixing a nozzle to the mounted flange via one or more fasteners inserted into the first plurality of fastener slots.

Particular variations of this method may include scenarios where the nozzle comprises a quick-connect nozzle, may include affixing the mounted flange to a bowl of a jet boat, including where the bowl is a double drilled bowl or a split bowl. This method may even be carried out while a snoot and flow diverter assembly is coupled to the rotating flange via at least one of the plurality of fastener slots, however since many flow diverter assemblies include a steering arm extending from the jet boat and coupled with the flow diverter, the additional step of decoupling the steering arm from the flow diverter may be necessary.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
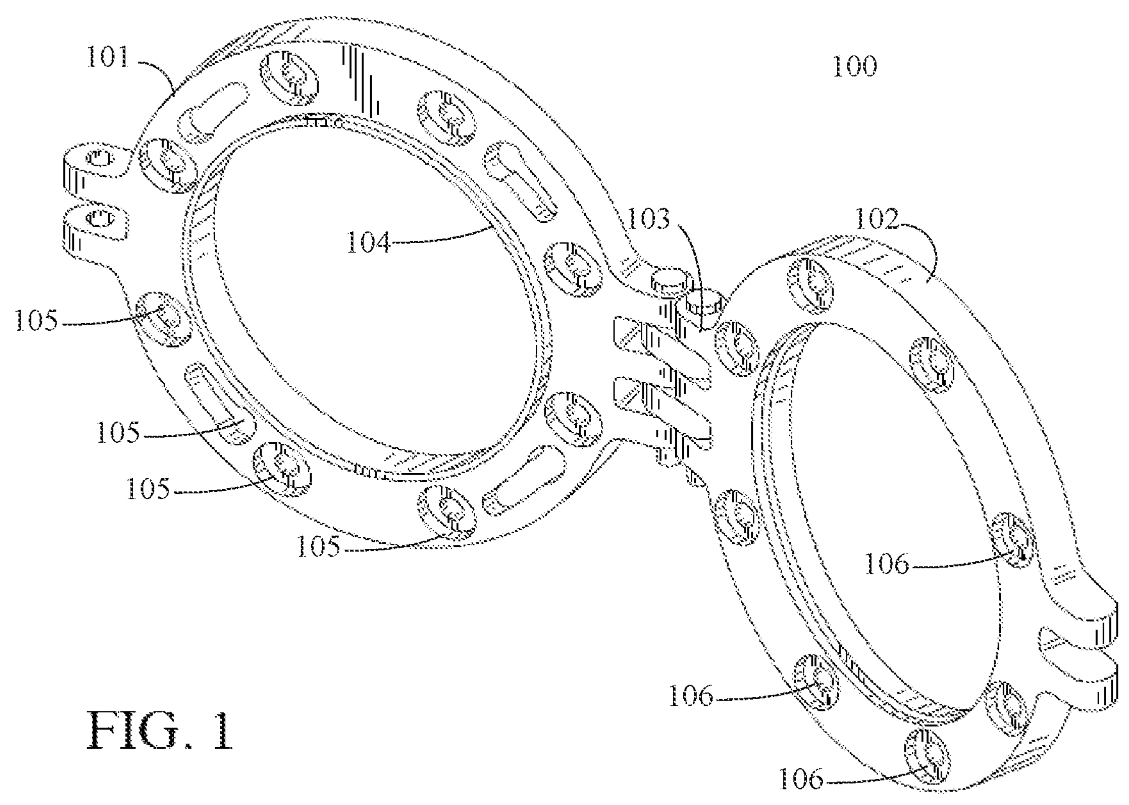
FIG. 1 depicts a perspective view of a hinged flange.

The present disclosure relates to the use of a hinged flange to allow a user to quickly remove a jet boat snoot and flow diverter assembly and secure a quick connect adapter to the flange to make use of water pumped through the jet drive of the jet boat as well as to move the snoot and flow diverter assembly into a position having a shorter overall length which may be advantageous for a boat owner who wishes to park their jet boat in a garage or other sheltering structure. It is to be understood that the term "jet boat" as used in this disclosure is intended to refer to any watercraft comprising a jet drive. FIG. 1 shows an exemplary embodiment of a hinged flange 100 in an open position. The hinged flange 100 comprises a mounted flange 101 and a rotating flange 102, with the two connected at a hinge 103. In many embodiments the mounted flange 101 is secured to a bowl of a jet boat via fasteners such as bolts or screws through a first plurality of fastener slots 105. It is contemplated however that a variety of methods may be used to secure the mounted flange to a jet boat such as welding, gluing, or other means of coupling without deviating from the spirit of the invention. In some embodiments the mounted flange further comprises a gasket 104 to create a watertight seal. In the exemplary hinged flange 100 the gasket 104 is shown as extending from the mounted flange 101, however it will be understood by those skilled in the art that a gasket 104 may take other forms such as an o-ring or other gasket type configured to fit between the mounted flange 101 and the rotating flange 102 when the rotating flange is in a closed position. The rotating flange 102 is configured to rotate between a closed position in which it is substantially flush with the mounted flange 101, and an open position as shown in which the rotating flange 102 is not substantially flush with the mounted flange. In many embodiments when the rotating flange 102 is in the closed position at least one of a second plurality of fastener slots 106 is in alignment with at least one of the first plurality of fastener slots 105, allowing a fastener to go through both slots to secure the mounted flange 101 and rotating flange 102 together. Additionally, the second plurality of fastener slots 106 are configured to allow the rotating flange to be coupled with both the mounted flange 101 and a snoot or other nozzle simultaneously.

Figure 2:
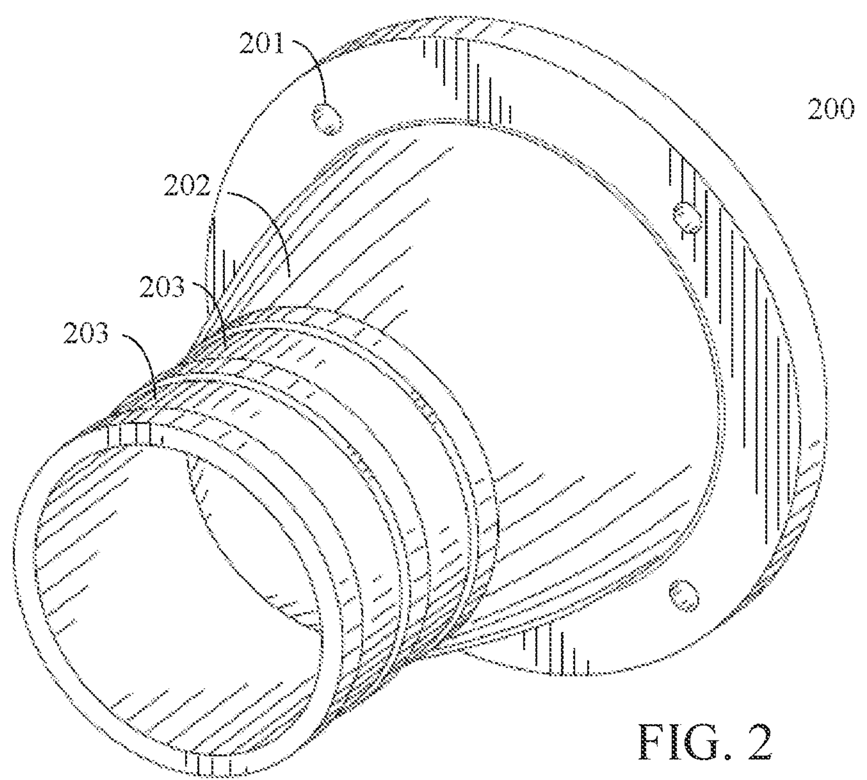
FIG. 2 depicts a perspective view of a quick connect adapter.

Referring now to FIG. 2, an exemplary embodiment of a quick connect adapter 200 is shown. In many embodiments the quick connect adapter 200 is coupled to the mounted flange 101 by sliding a fastener such as a bolt through an adapter coupling slot 201 and one or more of the first plurality of fastener slots 105. In some embodiments the quick connect adapter 200 comprises a nozzle 202 with quick connect grooves 203. In some embodiments a collet and o-ring on the female end of a quick connect may slot over the quick connect grooves 203 creating a water-tight seal.

Figure 3:
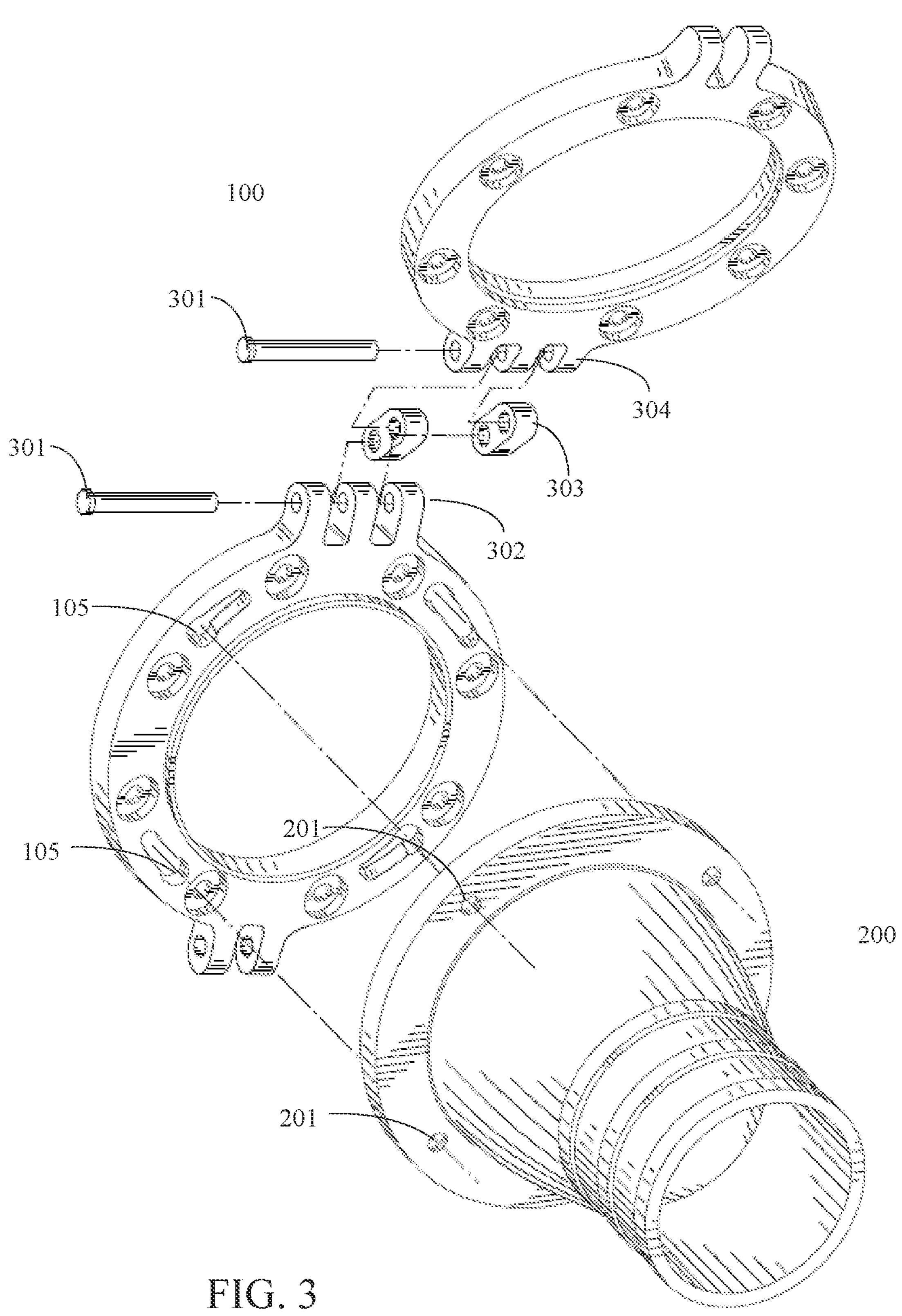
FIG. 3 depicts an exploded view of the hinged flange with the quick connect adapter aligned with fastener slots on the hinged flange.
Figure 4:
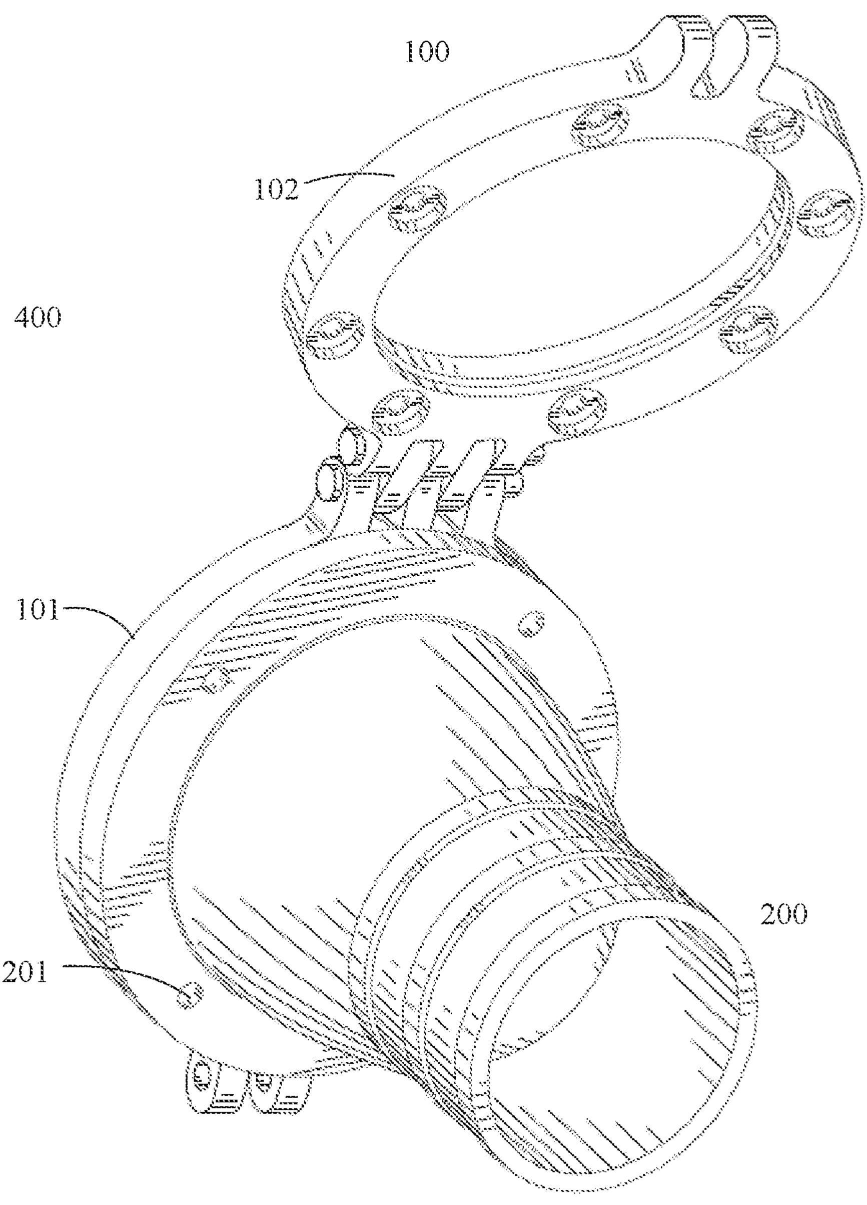
FIG. 4 depicts a perspective view of the hinged flange with the quick connect adapter placed flush with the hinged flange.

Referring now to FIG. 3, an exploded view of the hinged flange 100 with some of the first plurality of fastener slots 105 aligned with the coupling slots 201 of the quick connect adapter 200. In many embodiments the hinge 103 of the hinged flange 100 comprises one or more pins 301 which are configured to slide through slots in a first one or more hinge knuckle 302, hinge connector 303, and a second one or more hinge knuckles 304. When the one or more pins 301 are slotted through the first one or more hinge knuckles 302 of the mounted flange 101 and the second one or more hinge knuckles 304 of the rotating flange 102, and in some embodiments the hinge connector 303, the mounted flange 101 and the rotating flange 102 are configured to allow the rotating hinge 102 to rotate between an open and closed position. In some embodiments, the Referring now to FIG. 4, an exemplary embodiment of a hinge and adapter assembly 400 is shown. In these and other embodiments the quick connect adapter 200 is substantially flush with the mounted flange 101 of the hinged flange 100, such that a fastener can be slotted through the adapter coupling slot 201.

Figure 5:
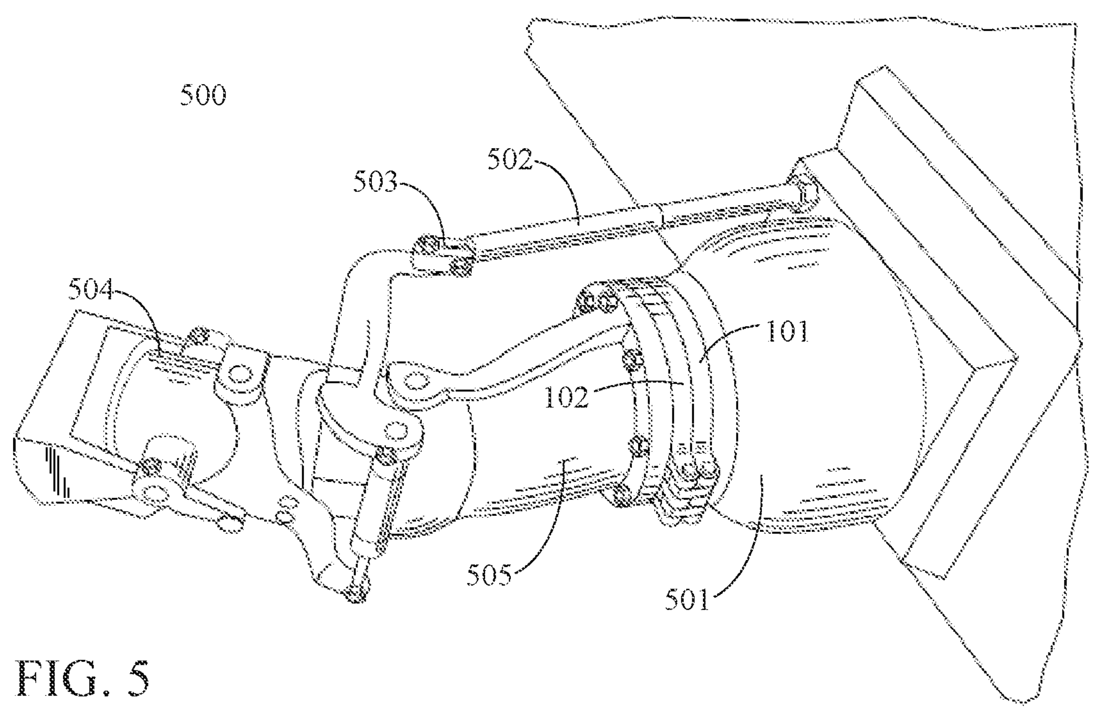
FIG. 5 depicts an embodiment of the hinged flange attached to a jet boat bowl by the mounted flange, and a snoot and flow diverter assembly attached to the rotating flange.

Referring now to FIG. 5, an exemplary embodiment of a jet boat snoot and flow diverter assembly 500 is shown. In many embodiments the mounted flange 101 is coupled with a bowl 501 and the rotating flange 102 is coupled with a snoot 505. In many embodiments the bowl 501 may comprise a split bowl, a double drilled bowl, a double drilled split bowl, or other variations thereof known in the art. In these and other embodiments the snoot 505 may comprise a straight snoot, a droop snoot, or any other snoot type known in the art. In many embodiments a jet boat snoot and flow diverter assembly 500 includes a steering arm 502, coupled with a flow diverter 504 via a steering arm fastener 503. In such embodiments, the steering arm fastener 503 may be decoupled from the steering arm 502 to allow the rotating flange 102 to move to an open position. In some embodiments the flow diverter 504 may comprise a place diverter as shown, or a rudder. In most embodiments the rotating flange 102 is secured to the mounted flange 101 via at least one fastener which passes through the first plurality of fastener slots 105 and second plurality of fastener slots 106 described in FIG. 1. In some embodiments, the rotating flange 102 may be coupled to the mounted flange 101 using a ratcheting handle that clamps the rotating flange 102 and mounted flange 101 together. When that fastener is also removed the rotating flange 102 is able to rotate to an open position, moving the flow diverter 504 and snoot 505 out of alignment with the bowl 501.

Figure 6:
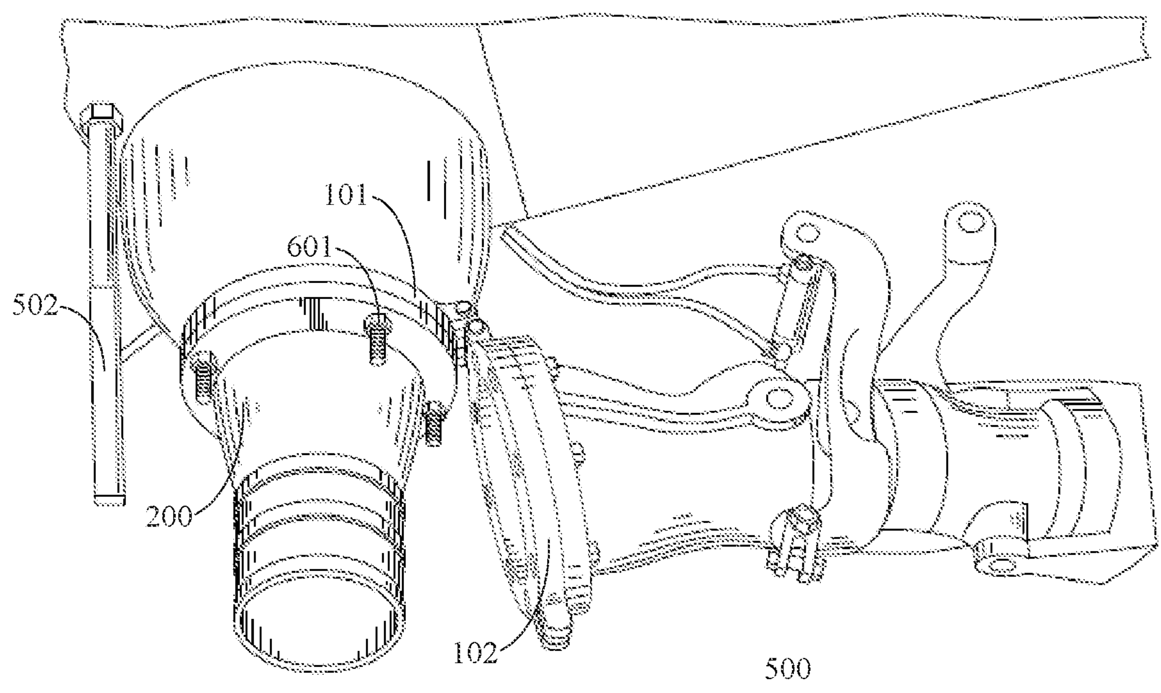
FIG. 6 depicts an embodiment of the hinged flange attached to a jet boat bowl by the mounted flange, and a snoot and flow diverter assembly attached to the rotating flange with the rotating flange in an open position.

Referring now to FIG. 6, an exemplary embodiment of a jet boat snoot and flow diverter assembly 500 with the rotating flange 102 in an open position and a quick connect adapter 200 attached to the mounted flange 101 is shown. In many embodiments, the flow of the jet boat may be repurposed by removing the fasteners coupling the mounted flange 101 to the rotating flange 102, allowing the user to rotate the rotating flange 102 to the open position shown. In most embodiments the steering arm 502 may also need to be decoupled from the jet boat snoot and flow diverter assembly 500 to allow the rotating flange to be rotated. In many embodiments once the rotating flange 102 is moved to an open position, the quick connect adapter 200 may be affixed to the mounted flange 101 via a fastener such as a nut and bolt fastener 601. Once the quick connect adapter 200 is affixed, a female end quick connect may be used to attach a tube or hose to direct water flowing through the jet boat to other systems. In some embodiments this may include a water-powered board such as a flyboard or jetboard, or other watersport equipment using pressurized water.

In places where the description above refers to particular implementations of systems and methods for a hinged flange with quick connect adapter for a jet boat, it should be readily apparent that a number of modifications may be made without departing from the spirit thereof and that these implementations may be applied to other to systems and methods for a hinged flange with quick connect adapter for a jet boat.

I claim:

1. A hinged flange comprising:

a mounted flange arranged and configured to couple with a bowl of a jet boat, the bowl comprising one of a split bowl or a double drilled bowl, wherein the mounted flange is further configured to couple with a nozzle; and a rotating flange coupled to the mounted flange via a hinge configured to allow the rotating flange to rotate between a closed position in which the rotating flange is substantially flush with the mounted flange and an open position in which the rotating flange is not substantially flush with the mounted flange, the rotating flange further configured to couple to the mounted flange when in the closed position via one or more fasteners and the rotating flange also being configured to couple with a snoot.

2. The hinged flange of claim 1 wherein the mounted flange is arranged and configured to couple with the bowl of the jet boat via a plurality of fastener slots.

3. The hinged flange of claim 1 further comprising a gasket coupled to the mounted flange.

4. The hinged flange of claim 1 wherein the snoot comprises at least one of a droop snoot and a straight snoot.

5. The hinged flange of claim 4 wherein the snoot is configured to couple with a flow diverter.

6. A hinged flange with snoot and flow diverter assembly comprising:

a hinged flange comprising:

a mounted flange comprising:

a first hinge knuckle along at least one edge of the mounted flange; and a first plurality of fastener slots;

a rotating flange comprising:

a second hinge knuckle along at least one edge of the rotating flange; and a second plurality of fastener slots; wherein the rotating flange is coupled to the mounted flange via a pin configured to pass through the first hinge knuckle of the mounted flange and the second hinge knuckle of the rotating flange, and the rotating flange is coupled to the mounted flange such that at least one fastener slot of the second plurality of fastener slots is substantially aligned with at least one fastener slot of the first plurality of fastener slots when the rotating flange is substantially flush with the mounted flange; and a snoot and flow diverter assembly coupled to the rotating flange via a fastener passed through at least one of the second plurality of fastener slots, the snoot and flow diverter assembly, the snoot flow diverter assembly comprising:

a snoot; and a flow diverter.

7. The hinged flange with snoot and flow diverter assembly of claim 6 wherein the hinged flange further comprises at least one hinge connector, the hinge connector comprising two or more slots configured to accommodate the pin.

8. The hinged flange with snoot and flow diverter assembly of claim 6 wherein the snoot comprises at least one of a straight snoot and a droop snoot.

9. The hinged flange with snoot and flow diverter assembly of claim 6 wherein the flow diverter comprises at least one of a rudder and a place diverter.

10. The hinged flange with snoot and flow diverter assembly of claim 6 wherein the hinged flange further comprises a gasket coupled to the mounted flange.

11. The hinged flange with snoot and flow diverter assembly of claim 6 wherein the mounted flange is coupled to a bowl of a jet boat via one or more fasteners inserted through the first plurality of fastener slots.

12. A method for repurposing water from a jet boat drive, the method comprising:

removing one or more fasteners from a hinged flange, the hinged flange comprising:

a mounted flange comprising:

a first hinge knuckle along at least one edge of the mounted flange; and a first plurality of fastener slots;

a rotating flange comprising:

a second hinge knuckle along at least one edge of the rotating flange; and a second plurality of fastener slots; and the rotating flange coupled to the mounted flange via a pin configured to pass through the first hinge knuckle of the mounted flange and the second hinge knuckle of the rotating flange, and the rotating flange is coupled to the mounted flange such that at least one fastener slot of the second plurality of fastener slots is substantially aligned with at least one fastener slot of the first plurality of fastener slots when the rotating flange is substantially flush with the mounted flange;

rotating the rotating flange away from the mounted flange; and affixing a nozzle to the mounted flange via one or more fasteners inserted into the first plurality of fastener slots.

13. The method of claim 12 further comprising affixing the mounted flange to a bowl of a jet boat.

14. The method of claim 13 wherein the bowl is double drilled.

15. The method of claim 13 wherein the bowl is a split bowl.

16. The method of claim 12 wherein:

the hinged flange further comprises:

a snoot and flow diverter assembly coupled to the rotating flange via at least one of the plurality of fastener slots, the snoot and flow diverter assembly comprising:

a snoot;

a flow diverter; and a steering arm extending from a jet boat and coupled with the flow diverter; and the method further comprises:

decoupling the steering arm from the flow diverter.

* * * * *